(12) United States Patent
Jeyaseelan et al.

(10) Patent No.: US 12,038,854 B2
(45) Date of Patent: Jul. 16, 2024

(54) TECHNOLOGIES FOR DYNAMIC INPUT/OUTPUT DATA TRANSFER RATE SCALING BASED ON POWER POLICY ENGINE

(71) Applicant: Intel Corporation, Santa Clara, CA (US)

(72) Inventors: Jaya L. Jeyaseelan, Campbell, CA (US); Barnes Cooper, Hillsboro, OR (US); Abdul R. Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 17/134,089

(22) Filed: Dec. 24, 2020

(65) Prior Publication Data
US 2021/0117347 A1    Apr. 22, 2021

Related U.S. Application Data

(60) Provisional application No. 63/065,858, filed on Aug. 14, 2020.

(51) Int. Cl.
| | |
|---|---|
| *G06F 13/16* | (2006.01) |
| *G06F 1/3234* | (2019.01) |
| *G06T 1/20* | (2006.01) |

(52) U.S. Cl.
CPC .......... *G06F 13/1668* (2013.01); *G06F 1/325* (2013.01); *G06T 1/20* (2013.01); *G06F 1/3265* (2013.01)

(58) Field of Classification Search
CPC .......... G06F 13/16; G06F 1/3234; G06T 1/20
See application file for complete search history.

(56) References Cited

U.S. PATENT DOCUMENTS

| | | | |
|---|---|---|---|
| 10,706,497 B1 * | 7/2020 | Yang ..................... | G06F 1/3206 |
| 11,243,603 B2 * | 2/2022 | Olsen .................... | G06F 1/3278 |
| 2014/0204101 A1 * | 7/2014 | Ramadoss ............... | G06T 1/20 |
| | | | 345/522 |
| 2017/0262955 A1 * | 9/2017 | Lin ....................... | G06F 1/3206 |
| 2022/0319470 A1 * | 10/2022 | Huang .................... | G09G 5/34 |

OTHER PUBLICATIONS

Seagate, "Seagate® Nytro® 3732, 3532, & 3332, SAS SSD", Nytro Enterprise, Sep. 2020, chrome-extension://efaidnbmnn-nibpcajpcglclefindmkaj/https://www.seagate.com/content/dam/seagate/migrated-assets/www-content/product-content/ssd-fam/nvme-ssd/_shared/docs/100867109_B.pdf, 88 pages.

* cited by examiner

*Primary Examiner* — Tammara R Peyton
(74) *Attorney, Agent, or Firm* — Alliance IP, LLC (57) ABSTRACT

Techniques for controlling input/output (I/O) power usage are disclosed. In the illustrative embodiment, a power policy engine of a compute device monitors power usage, I/O data transfer rates, and temperature and determines when there should be a change in an I/O power setting. The I/O data transfer requires that the data be handled properly, causing the compute device to expend power on the I/O data transfer. The power policy engine may instruct a device driver, such as a driver of an I/O device, to change a data transfer rate of the I/O device, reducing the power the compute device spends handling I/O.

25 Claims, 4 Drawing Sheets

TECHNOLOGIES FOR DYNAMIC INPUT/OUTPUT DATA TRANSFER RATE SCALING BASED ON POWER POLICY ENGINE

CROSS-REFERENCE TO RELATED APPLICATIONS

This application claims the benefit of provisional application 63/065,858, entitled "Dynamic I/O Scaling," which was filed on Aug. 14, 2020, and which is incorporated by reference herein in its entirety.

BACKGROUND

In compute devices such as systems-on-a-chip (SoCs), power density and thermal management can be a challenge. Increasing number of I/O ports and I/O bandwidth further aggravate the issue by increasing SoC power consumption when in use. On-chip compute power can be controlled through techniques such as dynamic voltage and frequency scaling (DVFS), but throttling the I/O interconnects by introducing low power link states or reducing data rate can cause data loss, bad user experience, or device failure. In current platform architectures, device DVFS is typically engaged for thermal management of a device and not for throttling interconnects.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
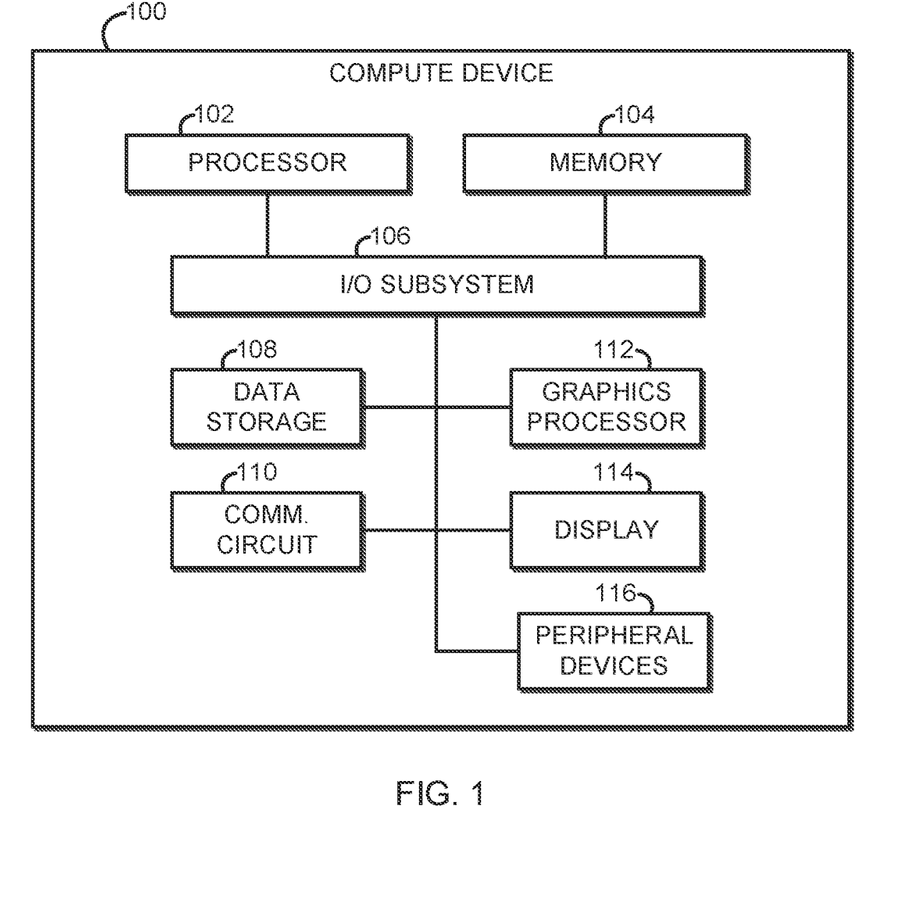
FIG. 1 is a simplified block diagram of at least one embodiment of a compute device for controlling input/output power usage.

Referring now to FIG. 1, an illustrative compute device 100 is configured to control input/output (I/O) power usage as necessary by instructing I/O device drivers to change a data transfer rate of the I/O device. For example, a power policy engine 202 (see FIG. 2) may instruct a device driver for a storage device to throttle I/O data transfer. The device driver may then delay I/O requests to the storage device, reducing power consumption of the compute device 100 caused by I/O traffic from the storage device. It should be appreciated that the power policy engine 202 does not need to be aware of the particular protocol used by the storage device or be aware of the specific actions the device driver may take to reduce power consumption. Rather, the details of how the power consumption is changed can be implemented by the device driver without additional involvement by the power policy engine 202.

Figure 2:
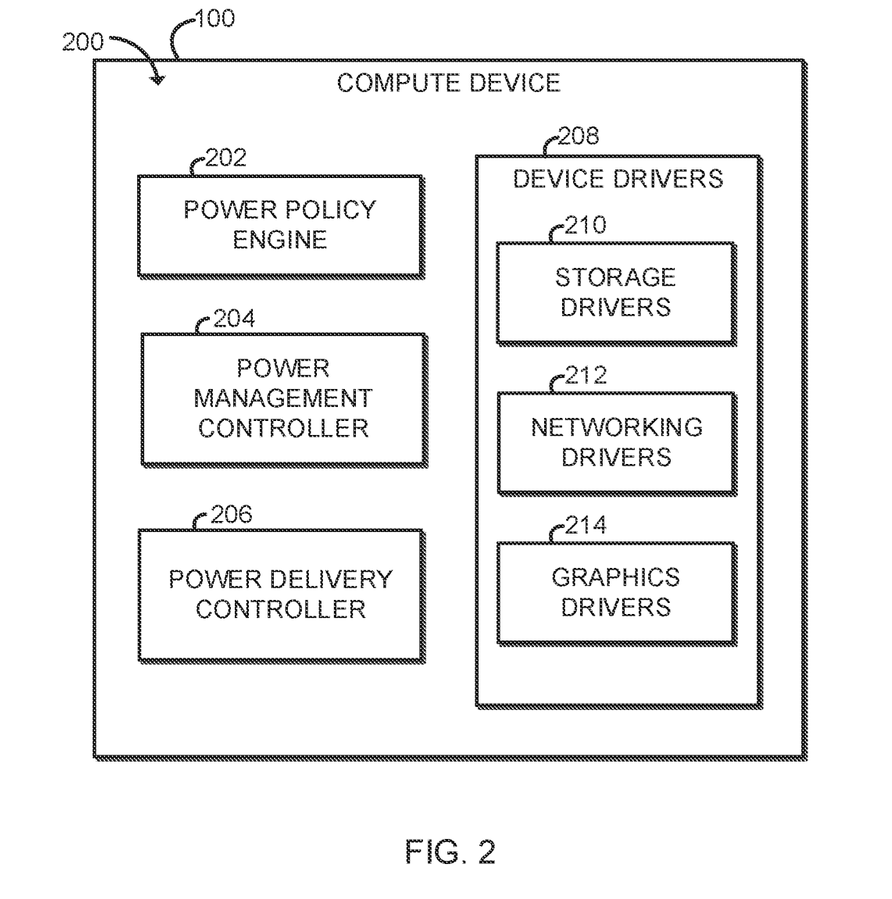
FIG. 2 is a simplified block diagram of at least one embodiment of an environment that may be established by the compute device of FIG. 1.

In addition, in some embodiments, the power policy engine 202 may control power usage of, e.g., the processor 102 using dynamic voltage and frequency scaling to stay within power limits of the compute device 100. However, it should be appreciated that forcibly throttling I/O interconnects by introducing lower power link states or reducing data rates can cause data loss, poor user experience, or device failure. As such, the power policy engine 202 may manage power impact of I/O devices on the compute device 100 by instructing device drivers to change the data transfer rate of the I/O devices.

As used herein, an I/O device refers to any device providing input and/or output to the processor 102, memory 104, or other component of the compute device 100. For example, an I/O device may refer to a storage device 108, a communication circuit 110, a graphics processor 112, an internal or external bus-connected device such as a USB device, a PCIe connected device, a Thunderbolt connected device, etc.

The compute device 100 may be embodied as any type of compute device. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. The illustrative compute device 100 includes a processor 102, a memory 104, an input/output (I/O) subsystem 106, data storage 108, a communication circuit 110, a graphics processor 112, a display 114, and one or more peripheral devices 116. In some embodiments, one or more of the illustrative components of the compute device 100 may be incorporated in, or otherwise form a portion of, another component. For example, the memory 104, or portions thereof, may be incorporated in the processor 102 in some embodiments. In some embodiments, one or more of the illustrative components may be physically separated from another component. For example, in one embodiment, an SoC with a processor 102 and memory 104 may be connected by a universal serial bus (USB) connector to a data storage 108 that is external to the SoC.

The processor 102 may be embodied as any type of processor capable of performing the functions described herein. For example, the processor 102 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 106 may connect various internal and external components of the compute device 100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The communication circuit 110 may be embodied as any type of interface capable of interfacing the compute device 100 with other compute devices, such as over one or more wired or wireless connections. In some embodiments, the communication circuit 110 may be capable of interfacing with any appropriate cable type, such as an electrical cable or an optical cable. The communication circuit 110 may be configured to use any one or more communication technology and associated protocols (e.g., Ethernet, Bluetooth®, Wi-Fi®, WiMAX, near field communication (NFC), etc.). The communication circuit 110 may be located on silicon separate from the processor 102, or the communication circuit 110 may be included in a multi-chip package with the processor 102, or even on the same die as the processor 102. The communication circuit 110 may be embodied as one or more add-in-boards, daughtercards, network interface cards, controller chips, chipsets, specialized components such as a field programmable gate array (FPGA) or application specific integrated circuit (ASIC), or other devices that may be used by the compute device 102 to connect with another compute device. In some embodiments, communication circuit 110 may be embodied as part of a system-on-a-chip (SoC) that includes one or more processors, or included on a multichip package that also contains one or more processors. In some embodiments, the communication circuit 110 may include a local processor (not shown) and/or a local memory (not shown) that are both local to the communication circuit 110. In such embodiments, the local processor of the communication circuit 110 may be capable of performing one or more of the functions of the processor 102 described herein. Additionally or alternatively, in such embodiments, the local memory of the communication circuit 110 may be integrated into one or more components of the compute device 102 at the board level, socket level, chip level, and/or other levels.

The graphics processor 112 is configured to perform graphics calculations, such as rendering graphics to be displayed on the display 114. Additionally or alternatively, in some embodiments, the graphics processor 112 may perform general computing tasks and/or may perform offload tasks that the graphics processor 112 is well-suited for, such as large parallel operations. The graphics processor 112 may be embodied as any type of processor capable of performing the functions described herein. For example, the graphics processor 112 may be embodied as a single or multi-core processor(s), a single or multi-socket processor, a digital signal processor, a microcontroller, or other processor or processing/controlling circuit.

The display 114 may be embodied as any type of display on which information may be displayed to a user of the compute device 100, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology. In some embodiments, the compute device 100 may have more than one display 114 connected to it. The compute device 100 may be able to disconnect some or all of the displays 114, such as to lower power used by the displays 114. Similarly, in some embodiments, the compute device 100 may be able to change various parameters of some or all of the displays 114 to lower power usage, such as changing a refresh rate, a resolution, etc.

In some embodiments, the compute device 100 may include other or additional components, such as those commonly found in a compute device. For example, the compute device 100 may also have peripheral devices 116, such as a keyboard, a mouse, a speaker, a microphone, a camera, an external storage device, etc. In some embodiments, the compute device 100 may be connected to a dock that can interface with various devices, including peripheral devices 116.

In the illustrative embodiment, various components of the compute device 100 may be able to monitor current power usage and/or a current temperature of the corresponding component. For example, the processor 102, the memory 104, etc., may have an integrated circuit or component capable of determining the power usage and/or temperature of the processor 102, the memory 104, etc., respectively. Additionally or alternatively, the compute device 100 may have separate components that measure the power and/or temperature of the components shown in FIG. 1.

Referring now to FIG. 2, in an illustrative embodiment, the compute device 100 establishes an environment 200 during operation. The illustrative environment 200 includes a power policy engine 202, a power management controller 204, a power delivery controller 204, and device drivers 206. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100 such as the memory 104, the data storage 108, etc. As such, in some embodiments, one or more of the modules of the environment 200 may be embodied as circuitry or collection of electrical devices (e.g., power policy engine circuitry 202, power management controller circuitry 204, power delivery controller circuitry 206, etc.). It should be appreciated that, in such embodiments, one or more of the circuits (e.g., the power policy engine circuitry 202, the power management controller circuitry 204, the power delivery controller circuitry 206, etc.) may form a portion of one or more of the processor 102, the memory 104, the I/O subsystem 106, the data storage 108, and/or other components of the compute device 100. For example, in some embodiments, some or all of the modules may be embodied as the processor 102 as well as the memory 102 and/or data storage 108 storing instructions to be executed by the processor 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. It should be appreciated that some of the functionality of one or more of the modules of the environment 200 may require a hardware implementation, in which case embodiments of modules which implement such functionality will be embodied at least partially as hardware.

The power policy engine 202, which may be embodied as hardware, firmware, software, virtualized hardware, emulated architecture, and/or a combination thereof as discussed above, is configured to manage an overall power policy of the compute device 100. The power policy engine 202 receives power and operation information from various components of the compute device 100 and, as necessary, instructs components of the compute device 100 to change power consumption or change an I/O data transfer rate. The power policy engine 202 may receive information from, e.g., the power management controller 204, the power delivery controller 206, the device drivers 208, various components of the compute device 100, etc.

The power policy engine 202 may receive power information from any suitable component in any suitable manner. For example, the power policy engine 202 may receive a current power usage, a current temperature, and/or a current I/O data transfer rate from components such as the processor 102, the communication circuit 110, the graphics processor 112, power monitoring circuits of the compute device 100, temperature monitoring circuits of the compute device 100, etc. It should be appreciated that the I/O data transfer of a device external to the compute device 100 causes power usage by the compute device 100 in order to properly handle the I/O data transfer. As a result, reducing the I/O data transfer rate reduces the power spent processing the I/O, freeing up power for other components such as the processor 102. In some embodiments, such as embodiments in which the compute device 100 is battery operated, the power policy engine 202 may monitor power provided to a device by the compute device 100, such as an external storage device connected to a type-C USB port. In some embodiments, the power policy engine 202 may monitor current power usage based on instructions previously sent to various components of the compute device 100 and may not require receipt of any additional information to determine a current power usage level.

Similarly, the power policy engine 202 may receive operation information from any suitable component in any suitable manner. For example, the power policy engine 202 may receive information relating to a current or future workload of the processor 102, the data storage 108, the communication circuit 110, the graphics processor 112, etc. The information may include a workload amount, a workload type, a workload priority, workload reliance on other components, etc. Operation information of a data storage 108 and/or a communication circuit 110 may include a queue depth, a bandwidth rate, etc.

The power policy engine 202 may process the power information and operation information to determine whether to make a change to a power setting. The power policy engine 202 may process the information in any suitable manner, such as by comparing a power usage or a temperature or I/O data transfer rate to a threshold. In some embodiments, the power policy engine 202 may monitor current as well as past power usage to determine whether to make a change to a power setting. For example, the power policy engine 202 may determine that the compute device 100 can be in a higher power state for a predetermined amount of time, such as any time between 1 millisecond and 1,000 seconds. The power policy engine 202 may calculate whether a power usage is past a threshold in any suitable manner, such as by comparing a current power usage to a threshold, integrating past power usage over a particular time frame, calculating an expected thermal effect, etc. The power policy engine 202 may also monitor operation information such as frequency, voltage, priority, and I/O bandwidth and throughput to determine whether to make a change to a power setting. For example, the power policy engine 202 may allow a high power usage to process a high priority task and then reduce power usage when the high priority task is complete.

The power policy engine 202 is configured to instruct other components of the compute device 100 to change operation when the power policy engine 202 determines that a change in an I/O power setting is appropriate. In the illustrative embodiment, the power policy engine 202 instructs the device drivers 208 to change a data transfer rate of the corresponding I/O device. For example, the power policy engine 202 may instruct a storage driver 210 to delay or otherwise throttle I/O operations on a storage device 108. The power policy engine 202 may instruct a network driver 212 to delay packets sent out or may instruct the network driver 212 to reduce a connection speed. The power policy engine 202 may instruct a graphics driver 214 to render graphics at a lower frame rate, refresh a display 114 at a lower refresh rate, render graphics at a lower resolution, display graphics on a display 114 at a lower resolution, etc. In some embodiments, the power policy engine 202 may instruct a device driver 208 to lower a data transfer rate of the corresponding I/O device (or increase an available data transfer limit) without providing any specific instructions as to how, leaving the details of how to lower the data transfer rate to the particular device drivers 208. It should be appreciated that the power policy engine 202 does not require any knowledge of how a data transfer rate can be lowered for a particular communication protocol, allowing the power policy engine 202 to interface with any suitable device driver 208 for any suitable interface, protocol, connector, interconnect, etc. In some embodiments, the power policy engine 202 may instruct a device driver 208 to lower a data transfer rate without providing a particular amount that the device driver 208 should reduce data transfer by.

In some embodiments, the power policy engine 202 may send an indication of a device power state to some or all of the device drivers 208, such as power states D0, D1, D2, D3, etc., including possible power sub-states such as D0ax, D3hot, D3cold, etc. In some embodiments, some device drivers 208 and/or the corresponding devices may support those power states and some may not.

Additionally or alternatively, in some embodiments, the power policy engine 202 may instruct other components such as the processor 102, the memory 104, and/or the graphics processor 112 to reduce power usage. For example, the power policy engine 202 may instruct the processor 102, the memory 104, and/or the graphics processor 112 to implement dynamic voltage and frequency scaling. In some embodiments, the power policy engine 202 may instruct a memory controller to reduce power usage, such as by delaying memory read or write requests, throttling memory bandwidth, etc.

The power policy engine 202 may have one or more user-defined policies that control power and thermal management. The policies may define an average power usage, a maximum power usage, an average I/O data transfer rate, a maximum I/O data transfer rate, various thresholds for when to lower or raise I/O bandwidth availability to various components, various actions to take when the various thresholds are crossed, etc. It should be appreciated that, in addition to instructing components to reduce I/O data transfer rates, the power policy engine 202 can also instruct components to increase I/O data transfer rates or notify components that increased I/O data transfer rates are permitted. In some embodiments, the power policies may define under what circumstances different components should be prioritized. For example, if the processor 102 has a high workload amount or high workload priority, the processor 102 may be provided additional power at the expense of reduced I/O data transfer for I/O components. Alternatively, if the processor 102 does not have a high workload or has a low priority workload, the processor 102 may be provided less power and more power may be used to service I/O data transfer for I/O components.

The illustrative power management controller 204, which may be embodied as hardware, firmware, software, virtualized hardware, emulated architecture, and/or a combination thereof as discussed above, is configured to manage power related to certain components of the compute device 100, such as the processor 102, the memory 104, the graphics processor 112, etc. In the illustrative embodiment, the power management controller 204 may be integrated onto a SoC with the processor 102, the memory 104, and the graphics processor 112. The power management controller 204 may communicate with the power policy engine 202 that is not integrated into the SoC. In other embodiments, the power management controller 204 and the power policy engine 202 may be on the same chip or integrated into the same component. In some embodiments, the power management controller 204 may be partially or fully integrated into the power policy engine 202.

The power management controller 204 is configured to communicate with the power policy engine 202 to provide power information and operation as discussed above in regard to the power policy engine 202. For example, the power management controller 204 may send to the power policy engine 202 a current power usage, data transfer usage, and/or a current temperature from components such as the processor 102, the communication circuit 110, the graphics processor 112, power monitoring circuits of the compute device 100, temperature monitoring circuits of the compute device 100, etc. Similarly, the power management controller 204 may send the power policy engine 202 operation information relating to a current or future workload of the processor 102, the data storage 108, the communication circuit 110, the graphics processor 112, etc.

The power management controller 204 is also configured to receive and implement instructions from the power policy engine 202 to change a current power consumption. For example, the power management controller 204 may receive an instruction to enter a certain power state, such as power states D0, D1, D2, D3, etc. The power management controller 204 may also be configured to receive and implement an instruction to implement dynamic voltage and frequency scaling in regard to the processor 102, the memory 104, and/or the graphics processor 112.

The power delivery controller 206, which may be embodied as hardware, firmware, software, virtualized hardware, emulated architecture, and/or a combination thereof as discussed above, is configured to manage power delivered to devices powered by the compute device 100, such as USB3 drives, USB4 drives, USB4 local area network (LAN) devices, etc. The power delivery controller 206 may send information indicating a current power delivery contract and/or current power usage from each or all of the connected devices to the power policy engine 202. The power delivery controller 206 may also receive instructions from the power policy engine 202 to reduce power delivery. The power delivery controller 206 may then renegotiate power delivery contracts with the various connected devices. In some embodiments, the power delivery controller 206 may cut off power delivery to some or all of the connected devices if a power delivery contract cannot be agreed upon within the constraints provided by the power policy engine 202.

The device drivers 208, which may be embodied as hardware, firmware, software, virtualized hardware, emulated architecture, and/or a combination thereof as discussed above, are configured to manage various devices of the compute device 100 and, in particular, are configured to manage the I/O data transfer rates of the various devices of the compute device 100. The device drivers 208 may send power and operational information to the power policy engine 202, as discussed above in regard to the power policy engine 202. The device drivers 208 may also receive instruction from the power policy engine 202 to change the I/O data transfer rate of the various devices managed by the device drivers 208. The device drivers 208 may include any suitable drivers, such as storage drivers 210, networking drivers 210, and/or graphics drivers 214. Upon power-up of the compute device 100, the device drivers 208 may indicate to the operating system or other component of the compute device 100 the power management capabilities of the device drivers 208 during enumeration.

The storage drivers 210 may provide power and operation information to the power policy engine 202. Power and operation information may include an I/O data transfer rate, a device power rate, a bus link state, a queue depth, etc. The power policy engine 202 may instruct the storage drivers 210 to change an I/O data transfer rate in any suitable manner, such as by reducing a storage data rate, reduce a device power rate, change a bus link state, etc. In some embodiments, the storage drivers 210 may manage how an I/O data transfer rate reduction is managed without any specific instruction from the power policy engine 202 other than an instruction to reduce a data transfer rate. The storage drivers 210 may control, e.g., USB3 drives, NVMe drives, USB4 drives, etc.

The networking drivers 212 may provide power and operation information to the power policy engine 202. Power and operation information may include a networking data rate, a device power rate, a bus link state, a queue depth, etc. The power policy engine 202 may instruct the networking drivers 212 to lower a data transfer rate in any suitable manner, such as by reducing a network data rate, reduce a device power rate, change a bus link state, etc. The networking drivers 212 may, e.g., reduce a WiFi bandwidth rate, change a LAN bandwidth rate, change a 5G cellular bandwidth rate, etc. In some embodiments, the networking drivers 212 may manage how data transfer rate reduction is managed without any specific instruction from the power policy engine 202 other than an instruction to reduce a data transfer rate. The networking drivers 212 may control, e.g., a PCIe® LAN, a PCIe® Wifi, a PCIEe® 5G, a USB4 LAN, etc.

The graphics drivers 214 may provide power and operation information to the power policy engine 202. Power and operation information may include a frame rate, a refresh rate, a resolution, a number of connected displays 114, etc. The power policy engine 202 may instruct the graphics drivers 214 to lower a data transfer in any suitable manner, such as by reducing a refresh rate, reducing a frame rate, reduce a resolution, or reduce a number of displays 114 in use. The graphics drivers 214 may disconnect a display 114 or may instruct a user to disconnect or turn off a display 114. In some embodiments, the graphics drivers 214 may manage how a data transfer rate reduction is managed without any specific instruction from the power policy engine 202 other than an instruction to reduce a data transfer rate. The graphics drivers may control a PCIe graphics processor, a PCIe Intel Graphics (iGfx) display, a USB4 display, etc.

Figure 3:
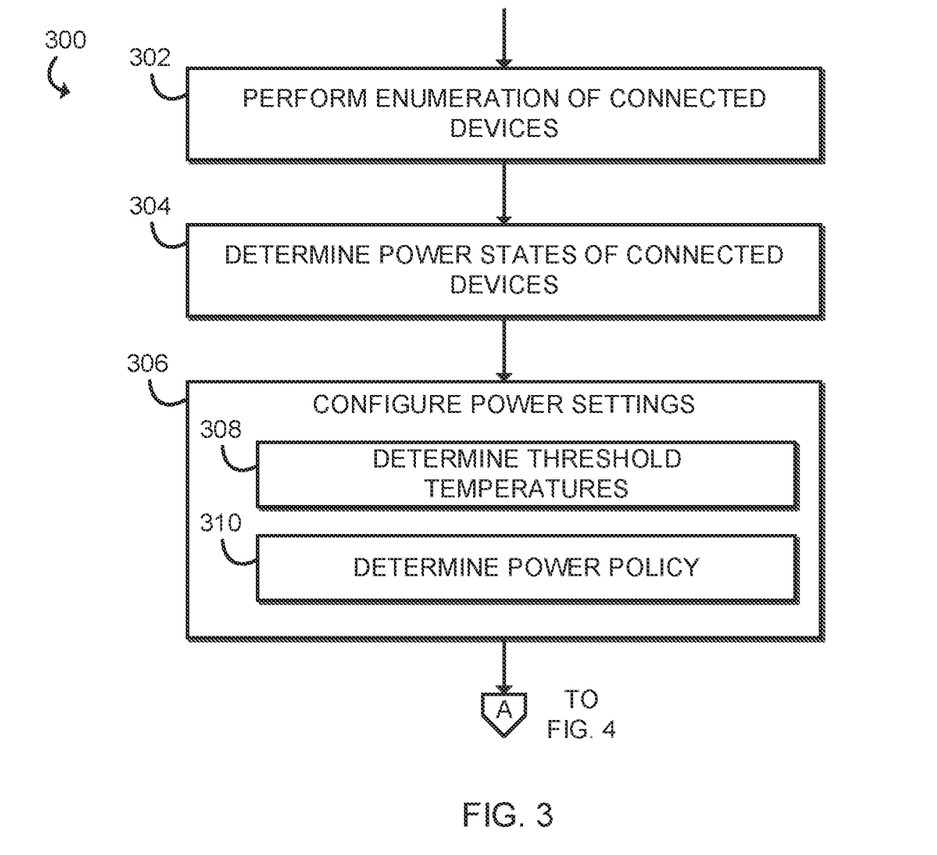
FIGS. 3-4 are a simplified flow diagram of at least one embodiment of a method for controlling input/output power usage that may be executed by the compute device of FIG. 1.

Referring now to FIG. 3, in use, the compute device 100 may execute a method 300 for dynamic I/O power scaling. The method 300 may be executed by any suitable component or combination of components of the compute device 100, including hardware, software, firmware, etc. For example, some or all of the method 300 may be performed by the processor 102, the memory 104, the power policy engine 202, etc. The method 300 begins in block 302, in which the compute device 100 performs an enumeration of connected devices. The compute device 100 may load device drivers 208 for the connected devices and determine the power management capabilities of the device drivers 208 and the corresponding devices. For example, the compute device 100 may determine whether the devices support various power state configurations.

In block 304, the compute device 100 determines the power state of connected devices. The compute device 100 may determine a power usage of various devices or components, a power delivered by a power delivery controller 206, a storage data rate of a storage device 108, a network data rate of a communication device 110, etc.

In block 306, the compute device 100 configures power settings. The compute device 100 may determine threshold temperatures on block 308 and may determine a power policy in block 310. The power policy may be one or more user-defined policies that control power and thermal management, such as policies that are stored in data storage 108, received from a communication circuit 110, and/or received from a user of the compute device 100. The policies may define an average power usage, a maximum power usage, an average data transfer rate, a maximum data transfer rate, various thresholds for when to lower or raise power availability or data transfer rate availability to various components, various actions to take when the various thresholds are crossed, etc. The method proceeds to block 312 in FIG. 4.

Figure 4:
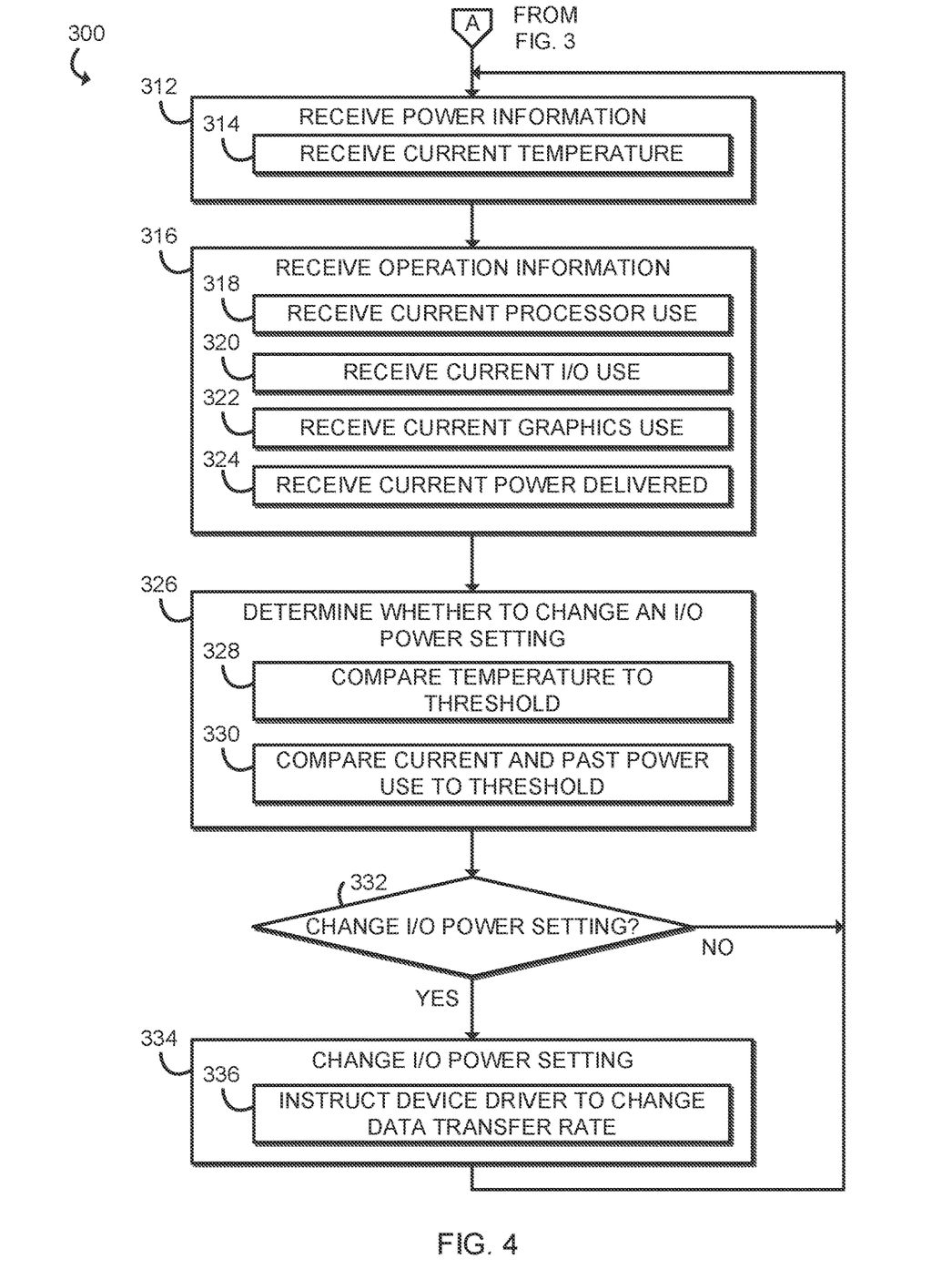

Referring now to FIG. 4, in block 314, the compute device 100 receives power information from various components of the compute device 100. The compute device 100 or a component thereof (such as the processor 102 or the power policy engine 202) receives power and operation information from various components of the compute device 100. Power information may be received from, e.g., the power management controller 204, the power delivery controller 206, the device drivers 208, various components of the compute device 100, etc. In block 314, the compute device 100 receives current temperature information indicating one or more temperatures of one or more components of the compute device 100.

The compute device 100 may receive power information from any suitable component in any suitable manner. For example, the compute device 100 may receive a current power usage, a current data transfer usage, and/or a current temperature from components such as the processor 102, the communication circuit 110, the graphics processor 112, power monitoring circuits of the compute device 100, temperature monitoring circuits of the compute device 100, etc. In some embodiments, the compute device 100 may receive information indicative of power provided to a device connected to the compute device, such as an external storage device powered by a type-C USB connection.

In block 316, the compute device 100 receives operation information relating to the current operation of the compute device 100. For example, the compute device 100 may receive information related to the current processor 102 use in block 318. The compute device 100 may receive information relating to the current I/O data transfer rate for various devices in block 320. The compute device 100 may receive information relating to the current graphics processor 112 use and may receive information related to current power delivered to bus-powered devices in block 324. The operation information may include a workload amount, a workload type, a workload priority, workload reliance on other components, a storage data rate, a network data rate, a bus link state, a display frame rate, a display refresh rate, a display resolution, etc.

In block 326, the compute device 100 determines whether to change an I/O power setting based on the power information and/or the operation information received. The compute device 100 may process the information to determine whether to change a power setting in any suitable manner, such as based on a power policy. For example, the compute device 100 may compare a current temperature to a threshold in block 328, or may compare current and/or past power use to a threshold in block 330. The compute device 100 may calculate whether a power usage is past a threshold in any suitable manner, such as by comparing a current power usage to a threshold, integrating past power usage over a particular time frame, calculating an expected thermal effect, etc. In some embodiments, the compute device 100 may additionally or alternatively monitor operation information to determine whether to make a change to a power setting.

In block 332, if the compute device 100 is not to change an I/O power setting, the method 300 loops back to block 312 to receive additional power information. If the compute device 100 is to change an I/O power setting, the method 300 proceeds to block 334, in which the compute device 100 changes an I/O power setting. The compute device 100 may change an I/O power setting in any suitable manner. In the illustrative embodiment, the compute device 100 instructs a device driver 208 to change a data transfer rate in block 336. For example, the compute device 100 may instruct a storage driver 210 to delay, throttle, or otherwise slow operations on a storage device 108. The compute device 100 may instruct a network driver 212 to delay packets sent out or may instruct the network driver 212 to reduce a connection speed. The compute device 100 may instruct a graphics driver 214 to render graphics at a lower frame rate, refresh a display 114 at a lower refresh rate, render graphics at a lower resolution, display graphics on a display 114 at a lower resolution, etc. In some embodiments, the compute device 100 may instruct a device driver 208 to lower a data transfer rate of the corresponding I/O device (or increase an available data transfer limit) without providing any specific instructions as to how, leaving the details of how to lower the data transfer rate to the particular device drivers 208. It should be appreciated that the component instruction the device drivers 208 does not require any knowledge of how a power usage can be lowered for a particular communication protocol. In some embodiments, a component may instruct a device driver 208 to lower a data transfer rate without providing a particular amount that the device driver 208 should reduce data transfer by.

It should be appreciated that the I/O data transfer of a device sending data to and from components within the compute device 100 causes power usage by the compute device 100 in order to properly handle the I/O data transfer. As a result, reducing the I/O data transfer rate reduces the power spent processing the I/O, freeing up power for other components such as the processor 102.

In some embodiments, the compute device 100 may send an indication of a device power state to some or all of the device drivers 208, such as power states D0, D1, D2, D3, etc., including possible power sub-states such as D0ax, D3hot, D3cold, etc. In some embodiments, some device drivers 208 and/or the corresponding devices may support those power states and some may not.

Additionally or alternatively, in some embodiments, the compute device 100 may instruct other components such as the processor 102, the memory 104, and/or the graphics processor 112 to reduce power usage. For example, the compute device 100 may instruct the processor 102, the memory 104, and/or the graphics processor 112 to implement dynamic voltage and frequency scaling. The method 300 then loops back to block 312 to receive additional power information.

EXAMPLES

Illustrative examples of the technologies disclosed herein are provided below. An embodiment of the technologies may include any one or more, and any combination of, the examples described below.

Example 1 includes a compute device for dynamic input/output (I/O) scaling, the compute device comprising a processor; a memory communicatively coupled to the processor; data storage comprising a device driver for an I/O device connected to the compute device; and a power policy engine to determine whether an I/O power setting of the compute device should be changed; and instruct the device driver to change a data transfer rate of the I/O device in response to a determination that the I/O power setting of the compute device should be changed, wherein the device driver is to change, in response to instruction by the power policy engine, the data transfer rate of the I/O device.

Example 2 includes the subject matter of Example 1, and wherein to determine whether the I/O power setting of the compute device should be changed comprises to determine whether a current temperature of the compute device is past a threshold value.

Example 3 includes the subject matter of any of Examples 1 and 2, and wherein the I/O device is a graphics processor, wherein to change the data transfer rate of the I/O device comprises to change a frame rate or a resolution of an output of the graphics processor.

Example 4 includes the subject matter of any of Examples 1-3, and wherein the I/O device is a data storage device, wherein to change the data transfer rate of the I/O device comprises to change a data storage rate of the data storage device.

Example 5 includes the subject matter of any of Examples 1-4, and wherein the I/O device is a communication circuit, wherein to change the data transfer rate of the I/O device comprises to change a network data rate of the communication circuit.

Example 6 includes the subject matter of any of Examples 1-5, and wherein to instruct the device driver to change the data transfer rate of the I/O device comprises to instruct the device driver to place the I/O device into one of a predefined plurality of power states.

Example 7 includes the subject matter of any of Examples 1-6, and wherein the compute device is to enumerate a plurality of devices upon startup of the compute device to determine, for each of the plurality of devices, whether the corresponding device supports being placed into the plurality of power states, wherein the plurality of devices comprises the I/O device.

Example 8 includes the subject matter of any of Examples 1-7, and wherein the power policy engine is further to instruct the device driver to change a power delivery contract with the I/O device in response to the determination that the I/O power setting of the compute device should be changed.

Example 9 includes the subject matter of any of Examples 1-8, and wherein the I/O device is a storage device, a communication circuit, or a graphics processor.

Example 10 includes a method for dynamic input/output (I/O) scaling, the method comprising determining, by a power policy engine of a compute device, whether to an I/O power setting of the compute device should be changed;

instructing, by the power policy engine and in response to a determination that the I/O power setting of the compute device should be changed, a device driver for an I/O device of the compute device to change a data transfer rate of the I/O device; and changing, by the device driver and in response to instruction by the power policy engine, the data transfer rate of the I/O device.

Example 11 includes the subject matter of Example 10, and wherein determining whether to the I/O power setting of the compute device should be changed comprises determining whether a current temperature of the compute device is past a threshold value.

Example 12 includes the subject matter of any of Examples 10 and 11, and wherein the I/O device is a graphics processor, wherein changing the data transfer rate of the I/O device comprises changing a frame rate or a resolution of an output of the graphics processor.

Example 13 includes the subject matter of any of Examples 10-12, and wherein the I/O device is a data storage device, wherein changing the data transfer rate of the I/O device comprises changing a data storage rate of the data storage device.

Example 14 includes the subject matter of any of Examples 10-13, and wherein the I/O device is a communication circuit, wherein changing the data transfer rate of the I/O device comprises changing a network data rate of the communication circuit.

Example 15 includes the subject matter of any of Examples 10-14, and wherein instructing the device driver to change the data transfer rate of the I/O device comprises instructing the device driver to place the I/O device into one of a pre-defined plurality of power states.

Example 16 includes the subject matter of any of Examples 10-15, and further including enumerating a plurality of devices upon startup of the compute device to determine, for each of the plurality of devices, whether the corresponding device supports being placed into the plurality of power states, wherein the plurality of devices comprises the I/O device.

Example 17 includes the subject matter of any of Examples 10-16, and further including instructing, by the power policy engine, the device driver to change a power delivery contract with the I/O device in response to the determination that the I/O power setting of the compute device should be changed.

Example 18 includes one or more computer-readable media comprising a plurality of instructions stored thereon that, when executed by a compute device, causes the compute device to determine, by a power policy engine of the compute device, whether an I/O power setting of the compute device should be changed; instruct, by the power policy engine, a device driver for an I/O device of the compute device to change a data transfer rate of the I/O device in response to a determination that the I/O power setting of the compute device should be changed, change, by the device driver and in response to instruction by the power policy engine, the data transfer rate of the I/O device.

Example 19 includes the subject matter of Example 18, and wherein to determine whether the I/O power setting of the compute device should be changed comprises to determine whether a current temperature of the compute device is past a threshold value.

Example 20 includes the subject matter of any of Examples 18 and 19, and wherein the I/O device is a graphics processor, wherein to change the data transfer rate of the I/O device comprises to change a frame rate or a resolution of an output of the graphics processor.

Example 21 includes the subject matter of any of Examples 18-20, and wherein the I/O device is a data storage device, wherein to change the data transfer rate of the I/O device comprises to change a data storage rate of the data storage device.

Example 22 includes the subject matter of any of Examples 18-21, and wherein the I/O device is a communication circuit, wherein to change the data transfer rate of the I/O device comprises to change a network data rate of the communication circuit.

Example 23 includes the subject matter of any of Examples 18-22, and wherein to instruct the device driver to change the data transfer rate of the I/O device comprises to instruct the device driver to place the I/O device into one of a pre-defined plurality of power states.

Example 24 includes the subject matter of any of Examples 18-23, and wherein the plurality of instructions further cause the compute device to enumerate a plurality of devices upon startup of the compute device to determine, for each of the plurality of devices, whether the corresponding device supports being placed into the plurality of power states, wherein the plurality of devices comprises the I/O device.

Example 25 includes the subject matter of any of Examples 18-24, and wherein the plurality of instructions further causes the compute device to instruct the device driver to change a power delivery contract with the I/O device in response to the determination that the I/O power setting of the compute device should be changed.

Example 26 includes a compute device for dynamic input/output (I/O) scaling, the compute device comprising means for determining, by a power policy engine of a compute device, whether to an I/O power setting of the compute device should be changed; means for instructing, by the power policy engine and in response to a determination that the I/O power setting of the compute device should be changed, a device driver for an I/O device of the compute device to change a data transfer rate of the I/O device; and means for changing, by the device driver and in response to instruction by the power policy engine, the data transfer rate of the I/O device.

Example 27 includes the subject matter of Example 26, and wherein the means for determining whether to the I/O power setting of the compute device should be changed comprises means for determining whether a current temperature of the compute device is past a threshold value.

Example 28 includes the subject matter of any of Examples 26 and 27, and wherein the I/O device is a graphics processor, wherein the means for changing the data transfer rate of the I/O device comprises means for changing a frame rate or a resolution of an output of the graphics processor.

Example 29 includes the subject matter of any of Examples 26-28, and wherein the I/O device is a data storage device, wherein the means for changing the data transfer rate of the I/O device comprises means for changing a data storage rate of the data storage device.

Example 30 includes the subject matter of any of Examples 26-29, and wherein the I/O device is a communication circuit, wherein the means for changing the data transfer rate of the I/O device comprises means for changing a network data rate of the communication circuit.

Example 31 includes the subject matter of any of Examples 26-30, and wherein the means for instructing the device driver to change the data transfer rate of the I/O device comprises means for instructing the device driver to place the I/O device into one of a pre-defined plurality of power states.

Example 32 includes the subject matter of any of Examples 26-31, and further including means for enumerating a plurality of devices upon startup of the compute device to determine, for each of the plurality of devices, whether the corresponding device supports being placed into the plurality of power states, wherein the plurality of devices comprises the I/O device.

Example 33 includes the subject matter of any of Examples 26-32, and further including means for instructing, by the power policy engine, the device driver to change a power delivery contract with the I/O device in response to the determination that the I/O power setting of the compute device should be changed.

The invention claimed is:

1. A compute device, the compute device comprising:
a processor;
a memory communicatively coupled to the processor;
data storage comprising a device driver for an I/O device connected to the compute device; and
a power policy engine to:
determine whether an I/O power setting of the compute device should be changed; and
instruct the device driver to change a data transfer rate of the I/O device in response to a determination that the I/O power setting of the compute device should be changed,
wherein the device driver is to change, in response to instruction by the power policy engine, the data transfer rate of the I/O device,
wherein the I/O device is a data storage device, wherein to change the data transfer rate of the I/O device comprises to change a data storage rate of the data storage device.

2. The compute device of claim 1, wherein to determine whether the I/O power setting of the compute device should be changed comprises to determine whether a current temperature of the compute device is past a threshold value.

3. The compute device of claim 1,
wherein the data storage comprises a second device driver for a second I/O device connected to the compute device,
wherein the power policy engine is to:
determine whether a second I/O power setting of the compute device should be changed; and
instruct the second device driver to change a data transfer rate of the second I/O device in response to a determination that the second I/O power setting of the compute device should be changed,
wherein the second device driver is to change, in response to instruction by the power policy engine, the data transfer rate of the second I/O device,
wherein the second I/O device is a graphics processor, wherein to change the data transfer rate of the second I/O device comprises to change a frame rate or a resolution of an output of the graphics processor.

4. The compute device of claim 1,
wherein the data storage comprises a second device driver for a second I/O device connected to the compute device,
wherein the power policy engine is to:
determine whether a second I/O power setting of the compute device should be changed; and
instruct the second device driver to change a data transfer rate of the second I/O device in response to a determination that the second I/O power setting of the compute device should be changed,
wherein the second device driver is to change, in response to instruction by the power policy engine, the data transfer rate of the second I/O device,
wherein the second I/O device is a communication circuit, wherein to change the data transfer rate of the second I/O device comprises to change a network data rate of the communication circuit.

5. The compute device of claim 1, wherein to instruct the device driver to change the data transfer rate of the I/O device comprises to instruct the device driver to place the I/O device into one of a pre-defined plurality of power states.

6. The compute device of claim 5, wherein the compute device is to enumerate a plurality of devices upon startup of the compute device to determine, for each of the plurality of devices, whether the corresponding device supports being placed into the plurality of power states, wherein the plurality of devices comprises the I/O device.

7. The compute device of claim 1, wherein the power policy engine is further to instruct the device driver to change a power delivery contract with the I/O device in response to the determination that the I/O power setting of the compute device should be changed.

8. A method, the method comprising:
determining, by a power policy engine of a compute device, whether an I/O power setting of the compute device should be changed;
instructing, by the power policy engine and in response to a determination that the I/O power setting of the compute device should be changed, a device driver for an I/O device of the compute device to change a data transfer rate of the I/O device; and
changing, by the device driver and in response to instruction by the power policy engine, the data transfer rate of the I/O device,
wherein the I/O device is a data storage device, wherein changing the data transfer rate of the I/O device comprises changing a data storage rate of the data storage device.

9. The method of claim 8, wherein determining whether the I/O power setting of the compute device should be changed comprises determining whether a current temperature of the compute device is past a threshold value.

10. The method of claim 8, further comprising:
determining, by the power policy engine, whether a second I/O power setting of the compute device should be changed;
instructing, by the power policy engine and in response to a determination that the second I/O power setting of the compute device should be changed, a second device driver for a second I/O device of the compute device to change a data transfer rate of the second I/O device; and
changing, by the second device driver and in response to instruction by the power policy engine, the data transfer rate of the second I/O device,
wherein the second I/O device is a graphics processor, wherein changing the data transfer rate of the second I/O device comprises changing a frame rate or a resolution of an output of the graphics processor.

11. The method of claim 9, further comprising:
determining, by the power policy engine, whether a second I/O power setting of the compute device should be changed;
instructing, by the power policy engine and in response to a determination that the second I/O power setting of the compute device should be changed, a second device driver for a second I/O device of the compute device to change a data transfer rate of the second I/O device; and changing, by the second device driver and in response to instruction by the power policy engine, the data transfer rate of the second I/O device, wherein the second I/O device is a communication circuit, wherein changing the data transfer rate of the second I/O device comprises changing a network data rate of the communication circuit.

12. The method of claim 8, wherein instructing the device driver to change the data transfer rate of the I/O device comprises instructing the device driver to place the I/O device into one of a pre-defined plurality of power states.

13. The method of claim 12, further comprising enumerating a plurality of devices upon startup of the compute device to determine, for each of the plurality of devices, whether the corresponding device supports being placed into the plurality of power states, wherein the plurality of devices comprises the I/O device.

14. The method of claim 8, further comprising instructing, by the power policy engine, the device driver to change a power delivery contract with the I/O device in response to the determination that the I/O power setting of the compute device should be changed.

15. One or more non-transitory computer-readable media comprising a plurality of instructions stored thereon that, when executed by a compute device, causes the compute device to:

determine, by a power policy engine of the compute device, whether an I/O power setting of the compute device should be changed;

instruct, by the power policy engine, a device driver for an I/O device of the compute device to change a data transfer rate of the I/O device in response to a determination that the I/O power setting of the compute device should be changed, change, by the device driver and in response to instruction by the power policy engine, the data transfer rate of the I/O device, wherein the I/O device is a communication circuit, wherein to change the data transfer rate of the I/O device comprises to change a network data rate of the communication circuit.

16. The one or more non-transitory computer-readable media of claim 15, wherein to determine whether the I/O power setting of the compute device should be changed comprises to determine whether a current temperature of the compute device is past a threshold value.

17. The one or more non-transitory computer-readable media of claim 15, wherein the plurality of instructions further causes the compute device to:

determine, by the power policy engine, whether a second I/O power setting of the compute device should be changed;

instruct, by the power policy engine, a second device driver for a second I/O device of the compute device to change a data transfer rate of the second I/O device in response to a determination that the second I/O power setting of the compute device should be changed, change, by the second device driver and in response to instruction by the power policy engine, the data transfer rate of the second I/O device, wherein the I/O device is a graphics processor, wherein to change the data transfer rate of the I/O device comprises to change a frame rate or a resolution of an output of the graphics processor.

18. The one or more non-transitory computer-readable media of claim 16, wherein the plurality of instructions further causes the compute device to:

determine, by the power policy engine, whether a second I/O power setting of the compute device should be changed;

instruct, by the power policy engine, a second device driver for a second I/O device of the compute device to change a data transfer rate of the second I/O device in response to a determination that the second I/O power setting of the compute device should be changed, change, by the second device driver and in response to instruction by the power policy engine, the data transfer rate of the second I/O device, wherein the I/O device is a data storage device, wherein to change the data transfer rate of the I/O device comprises to change a data storage rate of the data storage device.

19. The one or more non-transitory computer-readable media of claim 15, wherein to instruct the device driver to change the data transfer rate of the I/O device comprises to instruct the device driver to place the I/O device into one of a pre-defined plurality of power states.

20. The one or more non-transitory computer-readable media of claim 19, wherein the plurality of instructions further cause the compute device to enumerate a plurality of devices upon startup of the compute device to determine, for each of the plurality of devices, whether the corresponding device supports being placed into the plurality of power states, wherein the plurality of devices comprises the I/O device.

21. The one or more non-transitory computer-readable media of claim 15, wherein the plurality of instructions further causes the compute device to instruct the device driver to change a power delivery contract with the I/O device in response to the determination that the I/O power setting of the compute device should be changed.

22. The compute device of claim 1, wherein to change a data storage rate of the data storage device comprises to delay, by the device driver I/O requests to the storage device.

23. The compute device of claim 1, wherein the device driver is to determine one or more details of how power consumption is changed without additional involvement by the power policy engine.

24. The one or more non-transitory computer-readable media of claim 15, wherein to change a network data rate of the communication circuit comprises to reduce a WiFi bandwidth rate.

25. The one or more non-transitory computer-readable media of claim 15, wherein to change a network data rate of the communication circuit comprises to change a bus link state of the communication circuit.

* * * * *